(12) United States Patent
Koch et al.

(10) Patent No.: US 8,926,926 B2
(45) Date of Patent: Jan. 6, 2015

(54) EXHAUST PARTICULATE MANAGEMENT FOR GASOLINE-FUELED ENGINES

(75) Inventors: Calvin K. Koch, Huntington Woods, MI (US); Paul M. Najt, Bloomfield Hills, MI (US); Kushal Narayanaswamy, Sterling Heights, MI (US); David L. Hilden, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 946 days.

(21) Appl. No.: 12/625,624

(22) Filed: Nov. 25, 2009

(65) Prior Publication Data

US 2011/0120089 A1   May 26, 2011

(51) Int. Cl.
*B01D 45/00* (2006.01)
*B01D 46/00* (2006.01)
(Continued)

(52) U.S. Cl.
CPC .............. *F01N 3/035* (2013.01); *B01D 53/944* (2013.01); *F01N 3/0222* (2013.01);
(Continued)

(58) Field of Classification Search
USPC .............. 60/299, 311, 302; 423/213.2, 213.7, 423/239.1, 215.5
See application file for complete search history.

(56) References Cited

U.S. PATENT DOCUMENTS

| 4,929,406 A | 5/1990 | Abe et al. |
| 4,971,696 A | 11/1990 | Abe et al. |

(Continued)

FOREIGN PATENT DOCUMENTS

| CN | 2916160 Y | * | 6/2007 |
| CN | 101357584 | | 2/2009 |
| WO | 2009100097 | | 8/2009 |

OTHER PUBLICATIONS

Yukio Mizuno et al, Study on Wall Pore Structure for Next Generation Diesel Particulate Filter; SAE International; 2008 World Congress, Detroit, Michigan; Apr. 14-17, 2008; Diesel Exhaust Emission Control, 2008, SP-2154.

(Continued)

*Primary Examiner* — Roy King
*Assistant Examiner* — Jenny Wu
(74) *Attorney, Agent, or Firm* — Reising Ethington P.C.

(57) ABSTRACT

A thin layer of low mean-pore-size filter material that permanently accommodates the accumulation of exhaust particulates (as soot or a soot cake) is carried on a porous ceramic support. The supported filter material is closely coupled with the exhaust manifold of the engine, for the purpose of passive regeneration of stored particulates, and removes particulate matter from the exhaust which is directed through the filter layer and ceramic support. The oxygen content of the exhaust oxidizes the particulate matter on the filter material. In a preferred embodiment, a thin layer of the filter material is supported on inlet channel walls of a wall flow-through ceramic filter body to remove the particles from the exhaust. The filter body comprises an upstream exhaust gas flow inlet face with openings to a plurality of inlet channels and a downstream face with a like plurality of openings from outlet channels. The inlet channels are closed at the downstream face and the outlet channels are closed at the inlet face. So the exhaust stream enters the inlet channels and flows through the filter layers and supporting channel walls to an outlet channel. The filtered exhaust stream exits the outlet end of the filter body and is combined into an exhaust passage downstream of the filter body for further treatment as may be necessary.

10 Claims, 2 Drawing Sheets

(51) Int. Cl.
  *B01D 47/00* (2006.01)
  *B01D 53/00* (2006.01)
  *B01D 53/56* (2006.01)
  *B01D 57/00* (2006.01)
  *F01N 3/035* (2006.01)
  *B01D 53/94* (2006.01)
  *F01N 3/022* (2006.01)
  *F01N 3/10* (2006.01)
  *F01N 3/28* (2006.01)
  *F01N 13/00* (2010.01)

(52) U.S. Cl.
  CPC .............. *F01N 3/101* (2013.01); *F01N 3/103* (2013.01); *F01N 3/2828* (2013.01); *F01N 13/0097* (2014.06); *B01D 2255/915* (2013.01); *B01D 2255/9205* (2013.01); *B01D 2258/014* (2013.01); *F01N 2330/48* (2013.01); *F01N 2340/00* (2013.01); *F01N 2340/02* (2013.01); *F01N 2510/0684* (2013.01); *Y02T 10/22* (2013.01)
  USPC ..................................................... 423/215.5

(56) References Cited

U.S. PATENT DOCUMENTS

| | | | |
|---|---|---|---|
| 6,077,800 | A | 6/2000 | Takahashi et al. |
| 6,341,701 | B1 | 1/2002 | Takahashi et al. |
| 6,767,526 | B1 * | 7/2004 | Blanchard et al. ......... 423/418.2 |
| 6,810,660 | B2 * | 11/2004 | Hepburn et al. ................ 60/285 |
| 6,890,616 | B2 * | 5/2005 | Suwabe et al. ................ 428/117 |
| 6,946,013 | B2 * | 9/2005 | Alward et al. .................. 55/523 |
| 7,264,785 | B2 * | 9/2007 | Blakeman et al. ......... 423/213.2 |
| 7,571,602 | B2 | 8/2009 | Koch |
| 2002/0022272 | A1 * | 2/2002 | Kumar et al. ................... 436/37 |
| 2002/0162325 | A1 * | 11/2002 | Kato et al. ...................... 60/297 |
| 2005/0137779 | A1 * | 6/2005 | Gioannini et al. ............ 701/103 |
| 2007/0054803 | A1 * | 3/2007 | Miyairi ......................... 502/439 |
| 2007/0071656 | A1 * | 3/2007 | Wirth et al. ................... 422/180 |
| 2007/0104632 | A1 * | 5/2007 | Zuberi ....................... 423/213.2 |
| 2008/0093291 | A1 | 4/2008 | Isomura et al. |
| 2008/0096751 | A1 | 4/2008 | Isomura et al. |
| 2009/0031711 | A1 * | 2/2009 | Braun et al. .................... 60/297 |
| 2009/0206025 | A1 | 8/2009 | Ichikawa et al. |
| 2012/0247088 | A1 * | 10/2012 | Beall et al. ...................... 60/274 |

OTHER PUBLICATIONS

Yasuyuki Furuta et al, Study on Next Generation Diesel Particulate Filter; SAE International; 2009-01-0292.

* cited by examiner

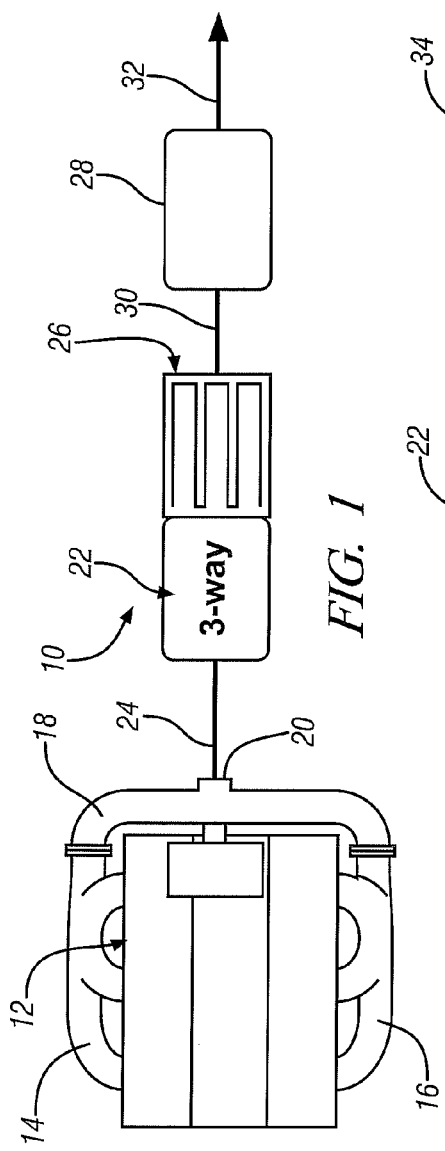
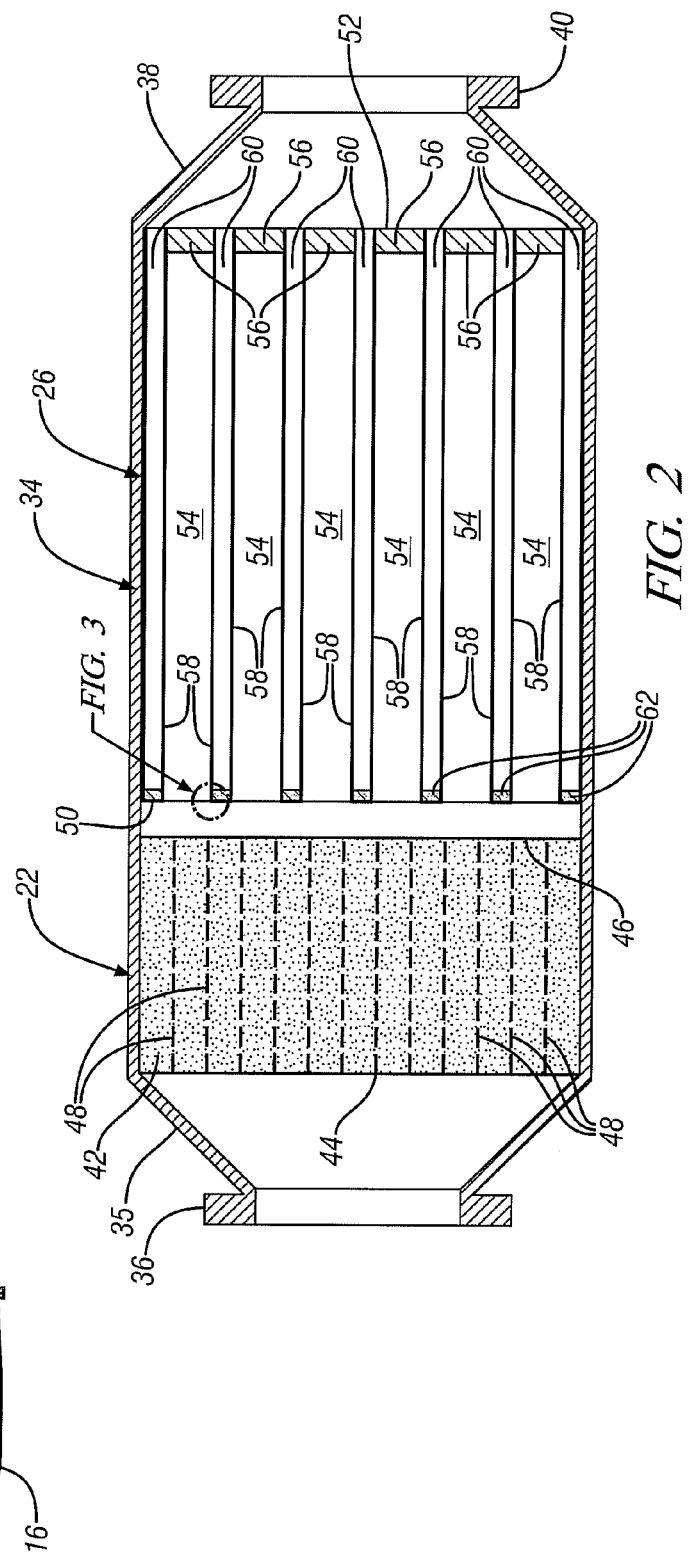

US 8,926,926 B2

EXHAUST PARTICULATE MANAGEMENT FOR GASOLINE-FUELED ENGINES

TECHNICAL FIELD

This disclosure and invention pertain to the removal and destruction of particulate material (largely carbon) in the exhaust of gasoline-fueled internal combustion engines such as are used on automotive vehicles. More specifically, this invention pertains to the trapping and oxidation of such particles in an exhaust gas flow-through filter placed close to the exhaust manifold of the engine.

BACKGROUND OF THE INVENTION

In many modern gasoline-fueled engines, the fuel is injected sequentially and directly into each cylinder of a multi-cylinder engine. There the fuel is mixed with at least a stoichiometric amount of air, spark-ignited, and burned to produce the powered stroke of the piston. Combusted gas is exhausted from each engine cylinder by reciprocating piston action and combined in one or more exhaust manifolds. The exhaust enters an exhaust duct in which it is treated by flowing through one or more catalytic converters before the exhaust is discharged to the atmosphere.

Many gasoline-fueled engines are operated by cycling the air-to-fuel ratio closely around the stoichiometric mass ratio. In this mode of engine operation, the exhaust is typically directed through the many longitudinal channels (e.g., 400 per $inch^2$ of inlet face) of an extruded cylindrical ceramic monolith. The walls of such flow channels are provided with a washcoat of platinum group metal (PGM) particles supported on alumina particles. Such a catalytic converter is called a 3-way converter because it cleans the exhaust gas by promoting the oxidation of both unburned hydrocarbons and carbon monoxide and, concomitantly, the reduction of nitrogen oxides (collectively NOx) to nitrogen. Other gasoline-fueled engines may be operated at a higher-than-stoichiometric air-to-fuel ratio. This mode of engine operation is called "lean burn" and it produces more oxygen in the exhaust which makes it more difficult to reduce NOx. A lean burn engine may use a monolithic converter coated with an oxidation-only PGM formulation to oxidize unburned hydrocarbons and carbon monoxide. The exhaust may then be further treated to oxidize NO to $NO_2$ and then subjected to selective catalytic reduction (SCR) of $NO_2$ to $N_2$.

The exhaust gas from fuel injected, gasoline-fueled, spark-ignited engines is also found to contain small carbon-containing, generally spherical particles. Generally, the particulate material averages about 70 nanometers in diameter and is typically less than about 200 nanometers in diameter or greatest dimension. These particles may agglomerate into small clusters. Attention may now be given to the management of such particulate matter from spark-ignited gasoline engines.

Diesel engines produce larger volumes of particulate matter per unit of operating time than gasoline-fueled engines. The particulate matter from such compression-ignition engines is accumulated as a soot cake on a porous filter. The accumulating soot cake thereafter serves as a very effective filter medium. But, from time to time during engine operation, the diesel soot layer becomes an intolerable resistance to exhaust gas flow, impeding engine operation, and has to be burned off the underlying filter body. Diversion of the vehicle's diesel fuel is required for burning-off the diesel soot. This diversion lowers the fuel efficiency of the vehicle and the environmental performance of its exhaust system. The practice of accumulating soot as a filter medium and periodically burning the exhaust soot with vehicle fuel is not considered to be a suitable option for removal of particulate matter from a gasoline-fueled engine.

It is an object of this invention to provide a practice for the filtration and concomitant passive oxidation of such particles in the exhaust system of a gasoline-fueled vehicle. It is a further object of this invention to take advantage of the relatively high temperature of the exhaust leaving a gasoline-fueled engine to obtain the passive oxidation of filtered particulates. Thus, it is a further object to accomplish the management of such small carbon particles with minimal effect on the oxidation or reduction of the gaseous exhaust contaminants or the fuel economy of the engine.

SUMMARY OF THE INVENTION

This invention provides practices for managing particulate carbonaceous matter in the hot exhaust gas stream emanating from a spark-ignited, gasoline-fueled, direct-injected vehicle engine.

In accordance with embodiments of this invention, carbon particle-containing, hot engine exhaust is directed through a ceramic filter wall or other supporting surface having large pores relative to the size of the carbon particles to be removed from the exhaust stream. For example, such ceramic support structure may be formed of cordierite, silicon carbide, aluminum titanate, or the like. One side of the flow-through ceramic body filter, preferably the upstream side, is coated with a thin layer of low mean-pore-size, high porosity, high temperature resistant, material (suitably a ceramic material) for removal by filtration of the particulate material from the hot flowing exhaust. The thin filter layer may be formed, for example, of silica particles, silicate particles, other ceramic particles, carbon-containing particles, or the like in a filter layer about 100 micrometers thick, the filter material having open pores up to about eight micrometers in diameter. For example, the filter layer may be formed on a ceramic body filter as a wet mass of silicate or other ceramic particles that are dried on the supporting substrate and, if appropriate, sintered or baked into a durable filter layer. The thin filter layer with its fine pore size and high porosity is composed and adapted to remove particulate matter from the exhaust stream. Thus, the thin filter layer is supported on the durable ceramic layer or body. The particulate matter is removed from the exhaust stream as a soot cake in the filter layer, and the exhaust gas flows through the larger pores of the ceramic support layer. However, unlike the management of diesel engine particulate material, the soot layer is not utilized, or relied on, as a filter medium; the filtered particulate material is passively oxidized from the filter layer by suitably hot, oxygen-containing exhaust gas flowing through it during engine operation.

As the particulate matter accumulates on and in the filter layer, some carbon particles are also gradually passively oxidized to carbon monoxide and carbon dioxide by the oxygen-containing exhaust stream during periods of engine operation. The exhaust from a gasoline-fueled engine may reach quite high temperatures (e.g., up to 1000° C.) depending on its current operating conditions. The oxidation of the filtered carbon particles is most rapid at exhaust temperatures of about 400° C. and higher. A small amount of ash may be retained on the filter material as the carbon particles are being accumulated and concurrently oxidized. The oxidation of the accumulated soot cake is a passive oxidation because it is on-going during periods of engine operation producing suitable exhaust temperatures without any specified regeneration cycle of engine or exhaust operation. The filter capacity of the small mean-pore-size, highly porous filter layer for the exhaust stream is determined for effective removal of the particulate material from the stream. Preferably, the filter layer is placed on surfaces or channel walls of a porous ceramic substrate that is shaped to present abundant filter layer material to the flow of exhaust gas so that particulate matter is removed and passively oxidized with minimal resistance to exhaust gas flow.

Preferably, the filter layer and supporting ceramic substrate is located closely to the engine to take advantage of the high temperature of the exhaust as it leaves the engine. In some embodiments of the invention, it may also be preferred to use a washcoat comprising an oxidation catalyst material or three-way catalyst material in combination with the thin, particulate matter filter layer. The presence of a platinum-group metal oxidation catalyst or three-way oxidation/reduction catalyst close to the hot exhaust at the engine exhaust outlet contributes to the conversion of gaseous contaminants to carbon dioxide, water, and nitrogen. The hot exhaust promotes light-off of the catalyst layer and exothermic reactions in the exhaust stream that heat and help destroy stored carbon particulate matter in the adjacent thin filter layer. As described above, the filter layer may be supported on a ceramic substrate which may have an upstream side (or inlet side) with respect to exhaust gas flow and a downstream or outlet side. The filter layer may be located on one side, preferably the inlet side of the support. A catalyzed washcoat layer may be placed on either or both sides of the ceramic support. And the catalyzed washcoat may be located above or below the filter layer when they are used together on a support surface.

In some embodiments, it may also be preferred to locate the particulate matter filter immediately downstream of a platinum group metal-coated or a three way catalyst-coated monolith which will also purify the exhaust and heat the exhaust gas to consume trapped particulate matter in the thin, particulate matter filter layer. The placement of a catalyst-coated monolith close to the exhaust outlet of the engine may enable the use of a smaller monolith using less catalyst.

In many embodiments of the invention it will be preferred to construct the porous ceramic filter support as a two-way asymmetric wall flow filter body or structure. For example, a body of cordierite material or silicon carbide material or aluminum titanate material may be extruded as a monolithic cylindrical body with many interspersed, parallel longitudinal gas flow inlet channels and sharing walls with gas flow outlet channels. The cross section of the cylindrical body may be round, oval, or a shape with flat upper and lower surfaces with semi-circular sides called a "race track shape." The body often has a flat inlet face, transverse to exhaust flow, with many openings to inlet channels. The body, likewise has a downstream flat outlet face, transverse to exhaust flow, with many outlet channel openings. The inlet channels are of larger diameter and volume than the outlet channels of the filter body (thus, an asymmetric filter structure). The extruded material is fired to form a durable structure with porous membrane walls that accommodate exhaust gas flow through them. Each of the many inlet channels is open to exhaust gas flow at the upstream end of the monolith body but the inlet channels are closed at the outlet end of the monolith. In a preferred embodiment the walls of the inlet channels are coated with the thin layer of particulate matter filter material. And, among the many options as described above and below in this specification, the thin filter layer may be coated with a washcoat of supported platinum group metal particles. Exhaust gas entering the inlet channels is forced to flow through the washcoat and the filter layer. Particulate matter is removed in the filter layer. The filtered exhaust then flows through the porous membrane walls of the monolith and exits the monolith through the relatively small diameter outlet channels. The outlet channels of the particulate filter may also be washcoated with a catalyst for treatment of the gaseous constituents of the exhaust stream.

Thus, a gasoline particulate matter filter is provided that functions in a very hot exhaust gas location. It is preferred that the filter substrate (such as a wall-flow filter) be located within about two to about eighty centimeters of the exhaust manifold of the engine. A thin layer of fine pore, high porosity, high temperature resistant filter material, carried on a durable ceramic, flow-through substrate, removes particulate, carbon-containing material from the exhaust. In contrast to the treatment of diesel exhaust, this filter material is relied on to remove particulate matter from the exhaust stream because the accumulating soot is regularly being passively oxidized. The filtered exhaust gas exits the filter after flowing through the relatively large pore ceramic body. Other elements of the exhaust system for oxidation and/or reduction of gaseous contaminants are complemented and not adversely affected by the trap for particulate matter. This invention greatly reduces the frequency or likelihood of active soot regeneration that requires diversion of engine fuel to burn and remove the filtered particulate matter.

Other objects and advantages of the invention will be apparent from a detailed description of preferred embodiments of the invention. Reference will be made to drawing figures that are described in the following section of this specification.

BRIEF DESCRIPTION OF THE DRAWINGS

FIG. 1 is a schematic illustration of a spark-ignited, gasoline-fueled engine from which the exhaust enters a close-coupled, three-way catalyst monolith followed immediately by a flow-through filter for carbon particles in the exhaust. An optional additional catalytic converter is illustrated downstream in the exhaust gas flow system.

FIG. 2 is a cross-sectional view of a combination of a close-coupled three-way or platinum group metal coated monolith and an asymmetric wall-flow filter in a metal can for removing and temporarily storing carbonaceous particulate matter from the exhaust of a gasoline-fueled engine. The inlet channels of the through-the-wall porous ceramic filter body are coated with a fine-pore filter layer for particulate matter in the exhaust and an overlying catalyst wash coat layer. The container of close coupled exhaust elements of FIG. 2 is located close-coupled with the exhaust manifold of the engine as illustrated in FIG. 1.

FIG. 3 illustrates the thin, low-mean-pore-size filter layer directly on the wall of the porous ceramic body. Applied over the thin filter layer is a thicker layer of a catalytic washcoat. The exhaust stream is illustrated as flowing successively, from an inlet channel, through the catalytic washcoat, the thin filter layer which removes particulate matter, and then through the wall of the ceramic body into an adjacent outlet channel of the porous ceramic body.

DESCRIPTION OF PREFERRED EMBODIMENTS

Figure 3:
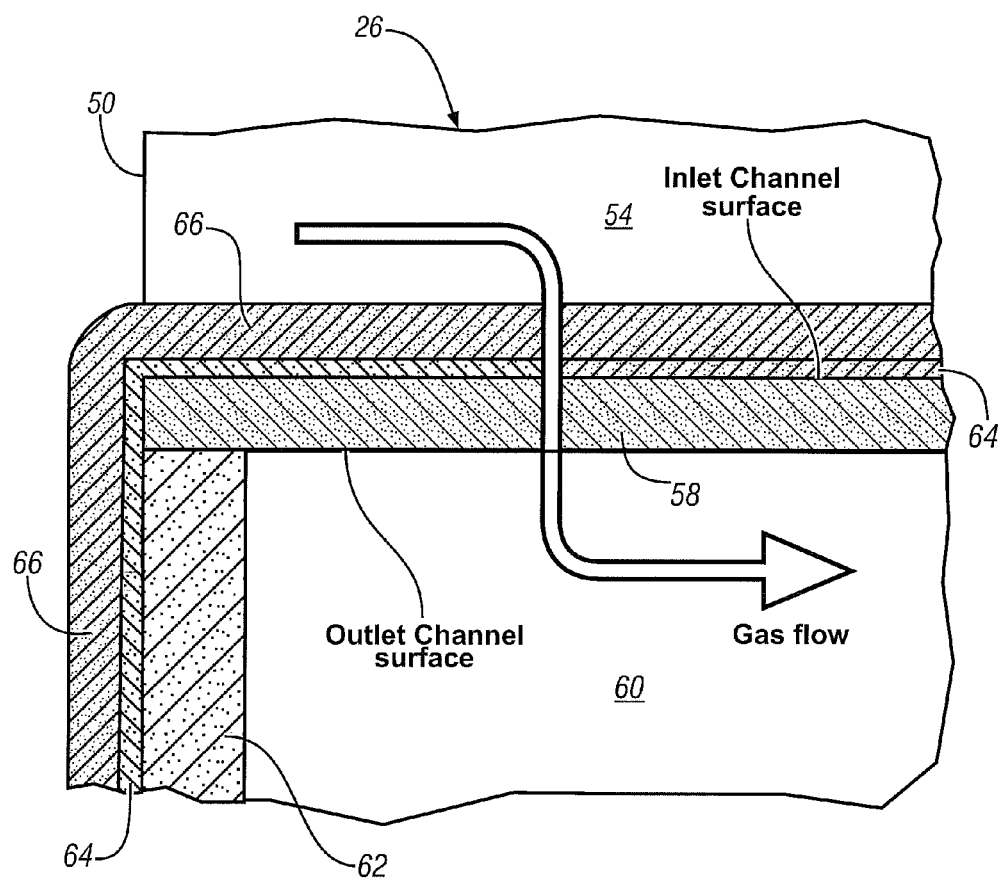
FIG. 3 is an enlarged view of a fragment of a wall of the filter shown at location (3) in FIG. 2.

Vehicle drivers have long observed a cloud of black, agglomerated particulates that may emanate from unfiltered/untreated exhaust of a diesel engine powered vehicle, particularly when the vehicle is accelerating under heavy engine loading. Such a cloud of particulates is not observed in the exhaust of gasoline-fueled engines. Still gasoline engines produce some very small, generally spherical, carbonaceous particles (e.g., about 20 to about 200 nanometers in size. It is recognized that the total mass of such particles from a mid-size vehicle engine may exceed about five milligrams per kilometer of driving and about $10^{12}$ particles per kilometer. A purpose of this invention is to reduce the amount of such very small particles from the gasoline engine exhaust without adversely affecting the fuel efficiency of the engine and the present successful reduction of undesirable gaseous constituents in the exhaust.

FIG. 1 is a schematic illustration of one embodiment of an exhaust system 10 for a gasoline-fueled, spark-ignition, multi-cylinder, internal combustion, and reciprocating piston engine. A top view of such an engine 12 is illustrated schematically (reduced in size) in FIG. 1. Depending upon the number and diameter of the engine cylinders and the stroke of the pistons, the engine has a displacement value (e.g., expressed in cubic inches, liters, or other volume designation) that has an effect on the flow rates of the exhaust gas which is to be filtered and otherwise treated in accordance with embodiments of this invention. As will be specified below in this specification, the displacement of the engine has an effect on the volume of the inlet passages to filter surfaces for carbon particulates in the exhaust of the engine.

As combustion gases are successively pushed out of the cylinders of engine 12 they are combined in one or more exhaust manifolds 14, 16 depending on whether the cylinders are arranged in-line or in a "V" configuration as illustrated in FIG. 1. The exhaust streams from V8 engine manifolds 14, 16 are combined in exhaust manifold connecting duct 18 which terminates in an engine exhaust outlet surface 20 for connection elements of an exhaust system as will be described. As the exhaust is combined to leave the engine it is quite hot, depending on current engine loading (e.g., idling vs. heavy acceleration). For example, the temperature of the exhaust leaving the engine may be in the range of about 200° C. to about 1000° C. In practices of this invention, it is preferred to have the exhaust gas enter the filter for the particulate material very soon after it exits the exhaust manifold of the engine.

The exhaust gas typically comprises, in varying amounts, carbon monoxide, carbon dioxide, unburned hydrocarbons, nitrogen oxides (collectively, NOx), water, residual oxygen, nitrogen, and a very small amount of carbon-containing particulate matter. The amounts of oxygen and NOx typically depend on whether the engine has been controlled (using a computer-based electronic control system) to operate at a close-to-stoichiometric air-to-fuel ratio (14.7 mass ratio) or at a higher air to fuel ratio of about 20 to about 40 as practiced in lean-burn gasoline-fueled engines. In an embodiment of the invention illustrated in FIGS. 1-3, the engine is operated at a close-to-stoichiometric air to fuel ratio.

In a preferred embodiment of this invention and still referring to FIG. 1, a three-way, catalyst-coated, ceramic honeycomb monolith 22 is placed close coupled with engine exhaust outlet surface 20 of the outlet of engine manifold 14, 16. As schematically illustrated in FIG. 1 a very short exhaust duct segment 24 may be interposed between the inlet to monolith 22 or the monolith may be placed immediately adjacent to exhaust outlet surface 20, as will be described.

A ceramic filter body 26 for removal of particulate matter from the exhaust stream is placed immediately downstream of three-way catalyst washcoated monolith 22. Filter body 26 carries a filter material for removal of the particles from the exhaust stream. It is preferred that the exhaust stream reach such filter material with an exhaust stream flow distance of no more than about eighty centimeters after leaving the exhaust manifold (for example, within eighty centimeters of passing an engine exhaust outlet surface 20).

After leaving ceramic filter body 26 the exhaust stream with reduced content of particulate matter may flow through one or more additional catalytic exhaust convertors for further treatment of gaseous constituents in the exhaust stream. For example, exhaust catalytic convertor 28 may be an additional three-way monolith reactor to complete the oxidation of CO and HCs and the reduction of NOx in the gasoline engine exhaust. Thus, in the embodiment illustrated in FIG. 1, the exhaust stream flows through three-way catalyst monolith 22, ceramic filter body 26, and downstream exhaust catalytic convertor 28 with interconnecting exhaust duct segments 24 and 30, and exhaust discharge outlet 32 to the atmosphere.

FIGS. 2 and 3 illustrate a preferred construction of a particulate matter filter used in this invention and a preferred combination of the filter with a catalyst washcoated monolith closely coupled to the exhaust manifold of a gasoline-fueled engine.

FIG. 2 illustrates a round cylindrical can 34 that is shaped of a metal, such as a stainless steel, for resisting degradation by hot engine exhaust. Can 34 is sized to contain an upstream honeycomb monolith 22 and a ceramic filter body 26 for management of particulate matter from gasoline engine 12. After placement of the monolith 22 and filter body 26 in can 34 the exhaust stream inlet end 35 is drawn inwardly to an inlet end attachment surface 36. Similarly, outlet end 38 of can 34 is drawn inwardly to an outlet end attachment surface 40. Inlet end attachment surface 36 may be used to weld can (and its contents) to exhaust duct segment 24 or to engine exhaust outlet surface 20 (referring to FIG. 1). Outlet attachment surface 40 may be used to connect can 34 to a downstream exhaust member such as exhaust duct segment 30.

Ceramic honeycomb monolith 22 is suitably extruded using a wet mass of cordierite particles into a round cylindrical body 42 with an upstream inlet face 44, a downstream outlet face 46 and many small, axially aligned, parallel flow channels (indicated schematically as 48). A typical catalyst-coated ceramic honeycomb monolith has about 400 channels per square inch of inlet face area. The walls of the channels (48 in FIG. 2) are coated with particles of a platinum-group metal composition deposited on alumina support particles (called a "washcoat" and too small to be suitably illustrated in FIG. 2). The composition of the catalyst particles in the washcoat is determined by the intended function of monolith 22. The catalyst composition may be set for three-way exhaust gas treatment as intended in this embodiment. In other embodiments, such as treatment of a lean burn exhaust, the washcoat may be formulated for oxidation of carbon monoxide and of unburned hydrocarbons.

In accordance with this illustrative embodiment, the volume of the flow channels 48 of the ceramic honeycomb monolith 22 may be less than or about 50% of the displacement of the engine. The monolith body 42 is suitably shaped with length-to-diameter ratio below about 1.0, and the body 42 is sealed to the inner wall of can 34 so that the exhaust gas flows through the channels 48 of the monolith 22.

The construction, materials, and location of the ceramic filter body 26 and its filter layer for particulate exhaust material are important elements of this invention. Reference is made to FIGS. 2 and 3, which are schematic and enlarged in certain respects to illustrate structural features of the filter body 26. FIG. 2 is a cross-sectional view of the filter body 26 and FIG. 3 presents an enlarged view of a small section of the filter body 26 at location "3" of FIG. 2.

In this embodiment of the invention, ceramic filter body 26 is also formed (like ceramic monolith 22) as a round cylinder to fit within can 34. Ceramic filter body 26 may be formed in other cross-sectional shapes such as an oval shape or race track shape. Ceramic filter body 26 may also be formed by extrusion of a suitable wet mass of particles of cordierite material, silicon carbide material, aluminum titanate material, or the like. After the wet material is extruded to a desired shape, it is fired to form a strong structural body having high porosity (e.g., greater than 55% porosity) for permitting the flow of exhaust gas through portions of the body without excessive impeding of the flow. The extrusion is shaped to form a ceramic filter body 26 structure comprising an inlet face 50 and an outlet face 52. Preferably inlet face 50 is located within two centimeters of outlet face 46 of the catalyst-coated ceramic monolith 22. Inlet face 50 comprises the openings to many inlet channels 54 that are suitably round in cross-section (Inlet channels 54 and outlet channels 60, described below, may be extruded with cross-sectional shapes other than round, such as square or diamond cross-sections). Each of the many inlet channels 54 are closed after the extrusion is formed at the outlet face 52 with plugs 56. The walls 58 of inlet channels 54 are thin and are shared with outlet channels 60. Outlet channels 60 are plugged 62 at the inlet face 52 of the filter body 26. The inlet channels 54 and outlet channels 60 are interspersed with shared walls 58 by the extrusion process; they are parallel and of substantially the same length. Thus, exhaust gas leaving the outlet face 46 of catalyst coated monolith 22 flows immediately into inlet channels 54 of filter body 26 (with their plugs 56 at their downstream ends), through thin porous ceramic walls 58, and into outlet channels 60. In this embodiment of the invention, the porous walls 58 of inlet channels 54 are coated with a thin layer of filter material (illustrated as layer 64 in FIG. 3) for blocking and filtering carbonaceous particulate matter from the exhaust stream flowing into channels 54 and through walls 58. The filtered exhaust gas leaves the outlet channels 60 of filter body 26 at outlet face 52. As stated above, the exhaust gas then leaves can 34 and enters an exhaust duct (such as duct segment 30 in FIG. 1) for further treatment in a catalytic converter or the like or for discharge to the atmosphere.

Preferably, the cross-sections of round inlet channels 54 are larger than the round cross-sections of round outlet channels 60 as illustrated in FIGS. 2 and 3. This asymmetry with respect to channel sizes and volumes is preferred because the inlet channels 54 will serve to temporarily store filtered particulate matter (and to permanently store any residual ash formed when the filtered particulates are oxidized). When filter body 26 is formed with inlet channels 54 that are larger than its outlet channels 60, it is, thus, an "asymmetric" flow-through filter body.

By way of illustrative example, a filter body 26 may be formed with 300 inlet channels per square inch (cpsi) of inlet face 50 area (suitably about 200 to about 600 cpsi). The diameters of the inlet channels 54 may be about 20% greater than the diameters of outlet channels 60 and the lengths of the channels 54, 60 may be about six inches. The diameters of the inlet channels 54 may be about 1.3 mm. The inlet cells and outlet cells collectively may occupy about 0.89 fraction of the cross-section of the filter body although the inlet channels 54 are only visible at inlet face 50 and the outlet channels 60 are only visible at outlet face 52. The thicknesses of walls 58 may, for example, be about 14 milli-inches.

FIG. 3 is an enlarged cross-sectional view of a small portion of filter body 26 taken at location 3 in FIG. 2. FIG. 3 illustrates the inlet face 50 near one side of a round inlet channel 54, a thin wall 58 separating inlet channel 54 and an adjacent round outlet channel 60 and shared by channels 54, 60. The location of FIG. 3 is at the upstream face of filter body 26 and shows plug 62 at the upstream end of outlet channel 60. In this embodiment of the invention, the walls 58 of inlet channels 54 (and plugs 62 to outlet channels 60) are first coated with a thin layer 64 of low mean-pore-size filter material adapted to remove particulate matter from the exhaust stream entering channels 54 and flowing through walls 58.

Suitably, filter material layer 64 is less than about 100 micrometers in thickness. Filter material layer 64 may be suitably formed of a ceramic material such as silica, a silicate, or the like with a pore size of about four micrometers, suitable to retain the very small particulate matter carried in the exhaust stream. Preferably, the filter material has a high level of total porosity to accomplish its filtering function with minimal resistance to exhaust gas flow through the filter layer.

The trapped particulate material soot is not illustrated in FIG. 3 because it is too small to see at the scale of the figure. In this embodiment of the invention as illustrated in FIG. 3, a washcoat layer 66 comprising particles of a platinum group metal on alumina particles has been applied over the filter material layer 64 on the inlet channel surface of wall 58. The purpose of washcoat layer 66 will be described in more detail below in this specification.

Filter body 26 is formed with essentially as many inlet channels 54 and outlet channels 60 as can be fitted in its cross section.

Thus, a substantial amount of the particulate matter is filtered from the exhaust gas by layer 64 and the gas flow continues through the porous filter body walls 58 into outlet channels 60 and out the filter body 26 into the continued, downstream exhaust system as illustrated in FIG. 1. While the mass of filter body 26 is relatively low and does not add appreciably to the mass of the exhaust system, the heat capacity of filter body 26 aids in the passive oxidation of filtered particulate carbon material by the residual oxygen in the hot exhaust gas stream. When the engine is started, the exhaust gas rapidly heats the contents of can 34. It is estimated that the ceramic honeycomb monolith 22 with its catalyst washcoat and filter body 26 need to be heated to a temperature of about 400° C. to commence passive oxidation of carbon particle soot in filter layer 64. If filter body 26 is not located immediately downstream of a monolith 22, as illustrated in FIGS. 1 and 2, it may be necessary for filter layer 64 to be heated to a higher temperature, e.g., about 500° C. to commence significant oxidation of filtered particulate matter. Despite changes in exhaust gas temperature due to different modes of engine operation, filter body 26 and filter layer 64 remain hot. As particulate material is caught in filter layer 64 it is oxidized to carbon-containing gases which in turn are oxidized by catalyst layers in filter body 26 or in downstream exhaust gas converters. As stated above, a small amount of residual ash material may be retained in and on the filter layer 64.

Thus, a primary function of filter body 26, or like filter structure with its thin layer of small pore filtering material, is the filtration of particulate carbon matter from the exhaust stream of the gasoline-fueled engine and the passive oxidation and removal of accumulated carbon soot from the filter. The oxidation of the soot, without changing normal engine operation, is facilitated by locating the filter material close to the exhaust outlet of a gasoline-fueled engine to take advantage of the higher temperature of the oxygen-containing exhaust stream. However, it is recognized that treatment of the exhaust gas requires both removal of particulate matter and the removal of gaseous unburned hydrocarbons, carbon monoxide, and oxides of nitrogen from the stream before it is released into the ambient atmosphere. The structure of a filter body, such as filter body 26, and its location in the engine exhaust system may also be advantageously used to promote oxidation and/or reduction of other exhaust gas constituents while filtering and passively oxidizing particulate matter. A filter material layer and supporting structure may be used in many and varied combinations with exhaust treatment catalyst compositions to accomplish both functions.

For example, an extruded monolithic porous ceramic honeycomb type filter body like that illustrated by ceramic filter body 26 in FIGS. 2 and 3 permits the location of the filter close to a catalytic converter such as the three-way catalyzed ceramic monolith 22 illustrated in FIGS. 1 and 2. But, moreover, ceramic filter body 26 provides channel surfaces for the deposition of catalyst washcoat materials so that a filter body, like filter body 26, may serve to both remove and destroy particulate matter and to oxidize unburned gaseous hydrocarbons and carbon monoxide and/or to reduce oxides of nitrogen, all with minimal effect on the efficiency of operation of the gasoline engine.

In FIG. 3, a catalyst washcoat layer 66 containing very small particles of a platinum-group metal catalyst material is illustrated as applied in inlet channels 54 as a layer over filter material layer 64. Washcoat layer 66 may be composed to serve as a 3-way catalyst material or as an oxidation catalyst material. In other embodiments of the invention, washcoat material 66 may be placed under filter material layer 64 in the inlet channels 54 of filter body 26. In still other embodiments of the invention, a suitable catalytic washcoat material may be placed on the walls of the outlet channels 60 of filter body 26 to contact exhaust gas that has passed through walls 58. And the composition of washcoat materials used on inlet or outlet channel walls may be provided to affect treatment of exhaust constituents from a lean burn gasoline-fueled engine. Thus, the filter body may also serve to complement upstream and downstream catalytic treatment of the exhaust gas by improved mass transport of emissions to the catalyst surface.

A thin filter material layer (as described above) may be placed on the walls of inlet channels or of outlet channels of a filter body, like filter body 26 so as to minimize resistance to flow of the exhaust through the functional layers on the channel walls. It is preferred that the filter material layer be placed on inlet channel walls. However, the filter material layer may be combined with an overlying or underlying layer of catalyzed washcoat material on an inlet or outlet channel wall of the filter body. While it is preferred that the filter material layer may be placed on only one of the inlet or outlet channel walls, catalyzed washcoat material may be applied on one or both of the inlet or outlet channel walls in using the filter body for exhaust gas treatment.

While embodiments of the invention have been described to illustrate practices of the invention, these embodiments are illustrative and not limiting of the scope of the invention.

The invention claimed is:

1. A method of removing carbon-containing particulate matter from an oxygen gas-containing exhaust gas stream exiting an exhaust manifold of a spark-ignited, gasoline-fueled engine, the method comprising:
    passing the exhaust gas stream with its oxygen gas and carbon-containing particulate matter from the exhaust manifold of the spark-ignited, gasoline fueled engine through a porous filter layer washcoat composition supported on a flow-through ceramic wall to remove the carbon-containing particulate matter from the exhaust gas of the spark-ignited gasoline fueled engine, the pore size of the material in the filter layer being about four micrometers and the flow-through thickness of the filter layer being up to about one hundred micrometers, the flow-through ceramic wall having pores that are larger than the carbon-containing particulate matter to be removed from the exhaust gas stream, the supported filter layer being located closely coupled with the exhaust manifold to retain the heat of the exhaust for passive oxidation of carbon-containing particulate matter entrained in the filter layer by the oxygen gas in the exhaust gas stream, the carbon-containing particulate matter containing exhaust encountering the filter layer after flowing no more than about eighty centimeters from the exhaust manifold; and
    oxygen gas in the exhaust stream exiting the exhaust manifold of the spark-ignited, gasoline-fueled engine serving to passively oxidize carbon-containing particulate matter removed into the filter layer.

2. A method as recited in claim 1 in which the filter layer washcoat composition is deposited on supporting wall surfaces of a ceramic filter body and the exhaust gas flows through the filter layer and then through the supporting wall of the filter body.

3. A method as recited in claim 1 in which the exhaust gas flows over an exhaust gas treatment catalyst layer lying against the filter layer washcoat composition.

4. A method as recited in claim 2 in which the porosity of the wall of the ceramic body is about 50% or larger.

5. A method as recited in claim 1 in which an oxidation or three-way exhaust flow-through monolithic catalytic converter is located upstream in the exhaust gas flow with respect to the filter body to promote exothermic reactions in the exhaust gas flow and heat the exhaust gas to promote oxidation of the entrained particulate matter, the inlet face of the filter body being located within two centimeters of the outlet face of the catalytic converter.

6. A method as recited in claim 1 in which the total volume of the inlet channels and outlet channels is at least equal to the displacement of the reciprocating pistons of the engine producing the exhaust.

7. A method as recited in claim 1 in which the washcoat composition applied to the walls of the inlet channels of the filter body incorporates a catalyst.

8. A method as recited in claim 1 in which the washcoat composition applied to the walls of the outlet channels of the filter body incorporates a catalyst.

9. A method as recited in claim 1 in which a layer of catalyzed washcoat is applied over a layer of washcoated filter material.

10. A method as recited in claim 1 in which a layer of catalyzed washcoat is applied under a layer of washcoated filter material.

* * * * *